Aug. 11, 1970  E. BAVERS  3,523,332
ROTATIONAL MOLDING APPARATUS FOR THERMOPLASTIC PRODUCTS
Filed Aug. 2, 1968  4 Sheets-Sheet 1
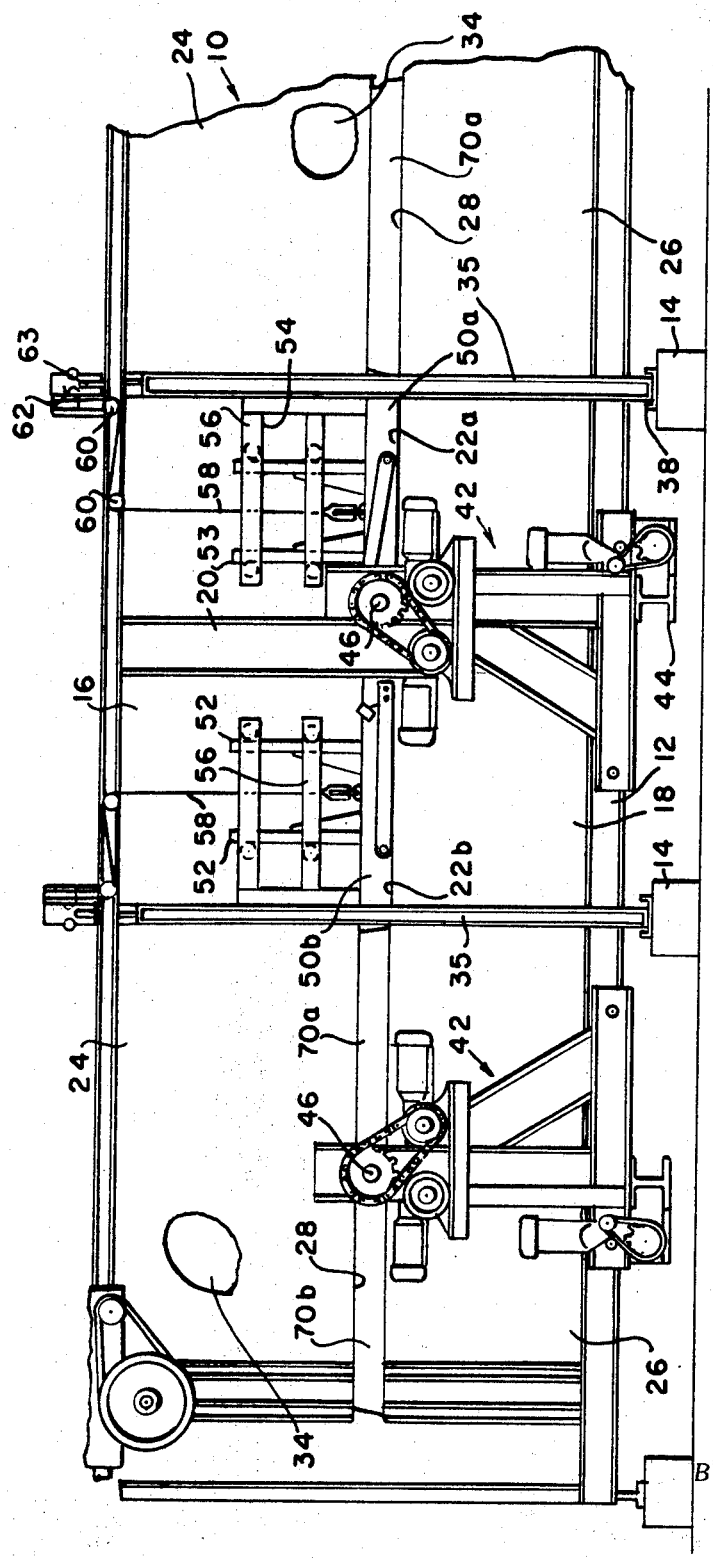
FIG. 1
ELLIOTT BAVERS
INVENTOR.
BY 
ATTORNEY

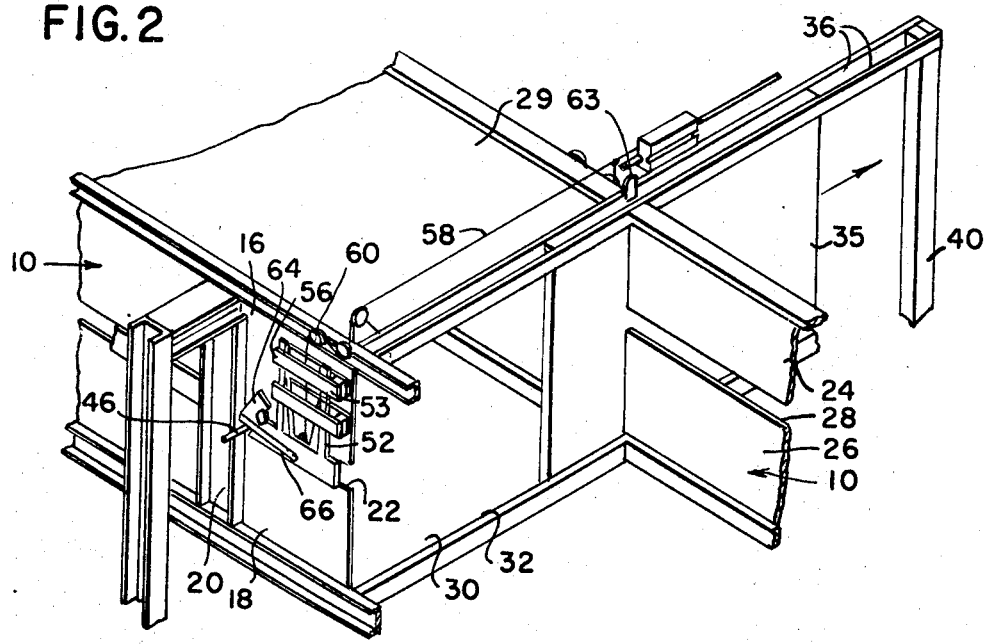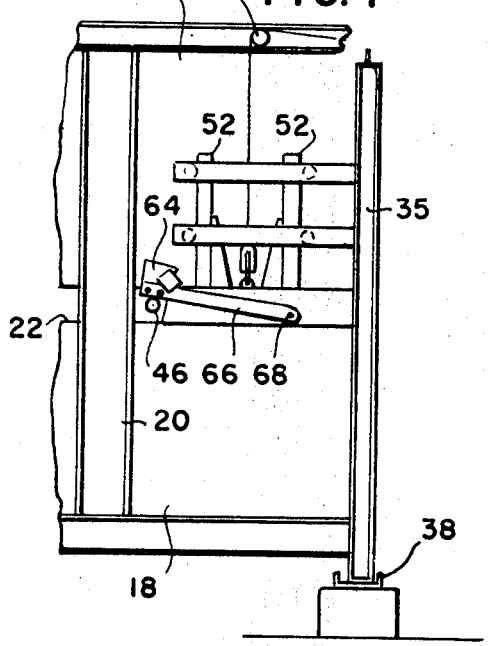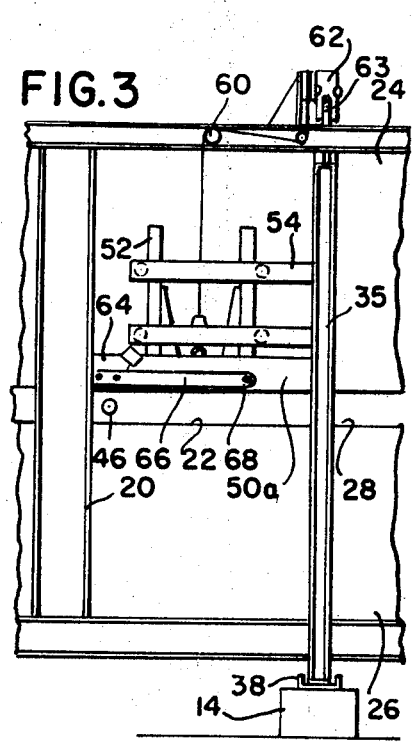

Aug. 11, 1970  E. BAVERS  3,523,332
ROTATIONAL MOLDING APPARATUS FOR THERMOPLASTIC PRODUCTS
Filed Aug. 2, 1968  4 Sheets-Sheet 3

ELLIOTT BAVERS
INVENTOR.
BY
ATTORNEY

Aug. 11, 1970     E. BAVERS     3,523,332

ROTATIONAL MOLDING APPARATUS FOR THERMOPLASTIC PRODUCTS

Filed Aug. 2, 1968     4 Sheets-Sheet 4

ELLIOTT BAVERS
*INVENTOR.*

BY *ATTORNEY*

UNITED STATES PATENT OFFICE

3,523,332
Patented Aug. 11, 1970

1

3,523,332
ROTATIONAL MOLDING APPARATUS FOR THERMOPLASTIC PRODUCTS
Elliott Bavers, New York, N.Y., assignor to Rotodyne Manufacturing Corporation, Brooklyn Navy Yard, Brooklyn, N.Y., a corporation of Delaware
Filed Aug. 2, 1968, Ser. No. 749,673
Int. Cl. B29c 11/00
U.S. Cl. 18—26                           19 Claims

ABSTRACT OF THE DISCLOSURE

Rotational molding apparatus, including an open-ended curing chamber and a cooling compartment at each open end thereof, doors movable to connect and separate the chamber and compartments, a continuous gap in each side wall of the apparatus for the passage of a rotary mold-supporting shaft through each compartment into the chamber, shutters movable by the movement of the doors to open the chamber gap upon opening of the door and to close the gap upon closing of the door, a pair of baffles for closing each compartment wall gap, each pivoted on said wall by one end adjacent the center of the gap and engageable by said shaft for movement into gap-opening and closing positions upon its movement through the gap; the baffles arranged to be both in gap-closing position when the shaft is at the gap center and to be spaced apart a distance to accommodate the shaft between them when in said position; means being provided for releasably maintaining the baffles in gap-closing position until moved therefrom by the shaft.

---

The present invention relates to rotational molding apparatus for thermoplastic articles, and is an extension and improvement of my invention described and claimed in my co-pending application Ser. No. 620,892, filed Mar. 6, 1967.

In my said co-pending application, I have described and claimed rotational molding apparatus consisting of a central curing oven with a cooling chamber at each end thereof. Each of the three chambers is described as formed of upper and lower wall sections spaced by a gap; the gap of the three chambers being alined and continuous. The curing chamber or oven is defined from the cooling chambers of the apparatus by laterally-sliding doors. The molds are supported on platforms which are mounted for rotation about a vertical axis on a shaft that is journaled for rotation around a horizontal axis and supported at both ends on a carriage whose upright sides are movable alongside of the side walls of the apparatus, on their exterior, with the ends of the shaft disposed in the gaps of the opposed side walls of the chambers.

The apparatus is described as including a pair of such carriages, each with its supporting rotary shaft, each alternately movable into the curing oven at the center from one of the cooling chambers.

In the apparatus of the said co-pending application it is necessary to close the gap in the oven chamber while the mold is being cured therein, to prevent escape of the curing heat, and also to close the gaps in the cooling chambers to prevent the escape of the cooling spray to the exterior of the apparatus. To that end, said apparatus is shown and described as provided with baffles slidable in the gaps, some of which are directly connected to uprights

2 of the mold-supporting carriages and others of which are reciprocated by the movement of the shafts within the gaps.

The construction of the invention of my said co-pending application is completely adequate and workable, especially for relatively small apparatus. Difficulties are encountered with the movement of the baffles in apparatus of larger size where the baffles are of substantial length and weight. Also, in said apparatus, difficulties are encountered with the baffles connected to the uprights that project from the gap when the molds are in the cooling chamber, such projecting baffles tending to interfere with the movement of the operator who empties and refills the molds.

It is an object of the present invention to provide apparatus of the character described having improved gap-closing means in which the necessity of the sliding of the baffles horizontally along the gaps is eliminated and the gap-closing thereby made easier and more certain.

It is another object of the present invention to provide apparatus, of the character described, having gap-closing means which at no time project from the apparatus in a manner to interfere with the operation thereof, especially in the stripping and refilling of the molds.

It is a further object of the present invention to provide apparatus, of the character described, having gap-closing baffles which are safe and sure and certain in operation, and may be used with rotational molding apparatus of the larger size with the same effectiveness as with apparatus of the small size.

The foregoing and other objects and advantages of the rotational molding apparatus of the present invention will become more readily apparent to those skilled in the art from the embodiment thereof shown in the accompanying drawing, and from the description following. It is to be understood, however, that such embodiments are shown by way of illustration only, to make the principles and practice of the invention more readily comprehensible and without any intent of limiting the invention to the specific details therein shown.

In the drawings:

FIG. 1 is a fragmentary side elevation of the rotational molding apparatus embodying the improvements of the present invention;

FIG. 2 is a fragmentary, top perspective view illustrating the manner and means for closing the gap in the curing chamber of the apparatus;

FIG. 3 is a fragmentary, elevational view showing the curing chamber gap-closing means in open position;

FIG. 4 is a view similar to FIG. 3, showing the gap-closing means in closing position;

Figure 5:
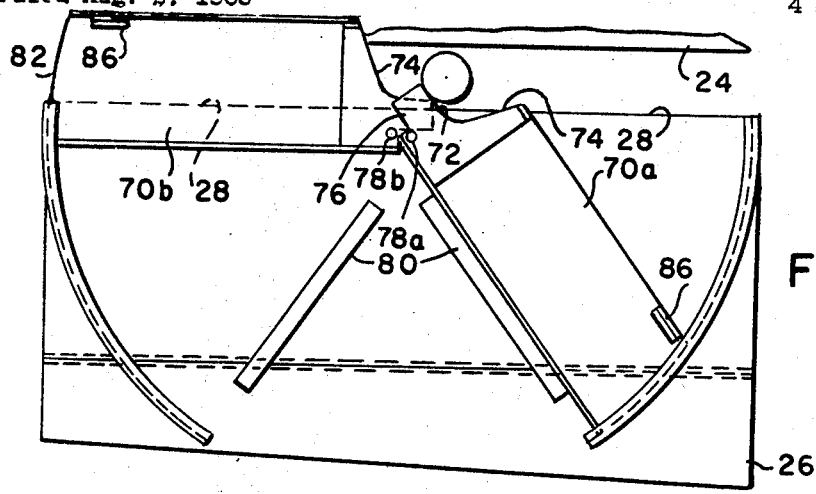
FIGS. 5, 6 and 7 are fragmentary views showing the closure means for the cooling chambers in several positions of opening and closing by the movement of the mold carriage.

Referring now, in greater detail, to the embodiment of the invention illustrated in the drawings, the same is shown to comprise a structure consisting of a pair of spaced parallel wall sections generally designated as 10, each mounted on a horizontally-disposed beam, 12, preferably of H shape and resting on one of its sides on one or more posts 14, that maintain it in relation elevated above a supporting surface.

The two wall sections 10 are suitably interconnected at top and bottom to form a rigid structure.

Each wall section 10 comprises six discrete panels including a pair of central upper and lower insulating wall panels, 16 and 18, respectively, which are supported at their horizontal center, as on an upright rising beam 20, from beam 12 in spaced-apart relation, to provide between them a horizontal gap, 22. The wall panels also include upper and lower panels, 24 and 26, to each side of central panels 16 and 18, that are likewise spaced apart from one another to form gaps 28, that are continuous with the gap 22. Each pair of panels 24 and 26 are also vertically spaced from panels 16 and 18.

Panels 16 and 18 of each of the walls 10, together with top and bottom walls 29 and 30, define a curing chamber, 32, that is provided with suitable heating means of any conventional type, such as ducts for admitting heated air (are not specifically illustrated), and with ventilating ducts for the escape of the heated air (also not specifically illustrated). Each set of panels 24 and 26 on each of the structure walls define between them cooling a compartment, 34, provided with conventional cooling means such as facilities for spraying water or the like (not illustrated, as being conventional).

The curing chamber 30 is provided with closure means for its open ends to selectively connect its interior with one of the adjacent cooling chambers 34. Such closure means comprises a transversely moving door, 35, which is mounted for lateral movement, as on top and bottom horizontal rails, 36 and 38, respectively, which are supported at one end on the structure frame and at the other end on uprights 40. Preferably, doors 35 are automatically, movable as by means of suitable electric motors and gears operatively connected to them (not shown).

The apparatus of the invention is provided with a pair of mold-supporting carriages or trolleys, each consisting of a pair of frame sections, each generally designated as 42, and each disposed on the exterior of one of the walls 10, of the structure, and suported for movement, as on a flange of a beam 12. Each frame section 42 is connected to the other by a tie-beam 44 below the beams 12, and support at their upper ends a rotatable shaft 46 which also supports a mold platform 48 that rotates with the shaft and is also rotatable on an axis perpendicular to the shaft, whereby such mold platform is rotatable along two axes. One of the frame sections 42 of each carriage may support electric motors that both, move the carriage horizontally and also rotate the mold supporting shaft 46.

Each carriage is supported for reciprocal movement into and out of the curing chamber from one of the cooling compartments 34 with its shaft 46 moving through the gap 28 of the cooling compartment and into the adjacent portion of the gap 22 of the curing chamber 30 to one side of the upright beam 20 supporting panels 16 and 18.

Beams 12 may extend past the cooling compartments 34, at each end, to provide service areas wherein the molds may be serviced after cooling.

In use, as explained in my said co-pending application, you may start with both doors 35 open. One of the carriages 42, at one end of the apparatus, may be loaded in the service area at that end and moved through the adjacent cooling compartment 34 with its shaft 46 passing through the gaps 28 in the walls thereof, into the heated curing chamber 32; the shaft 46 entering gap 22 and coming to rest against the beam 20. Both doors 35 are then closed. Opening and closing of doors 35 may be electrically and preferably cyclically automatically effected. Movement of the carriage 42 and rotation of shaft 46 may also be electrically effected, as by motors 43 and 45, respectively, mounted on carriage 42.

While the molds supported on shaft 46 of the carriage within the chamber 32 are being cured, the molds on the second carriage at the other end of the apparatus are serviced. At the end of the curing period, doors 35 are both opened; the first carriage moved out of chamber 32 into the adjoining compartment 34 for cooling. Simultaneously the shaft 46 of the second carriage is moved into chamber 32 and doors 35 closed. While the molds supported on the second carriage are rotated to have their contents cured, the molds on the first carriage are cooled and then moved into the adjoining service area, where they are stripped and reloaded.

These operations may be repeated, preferably cyclically automatically.

To prevent escape of heat from the curing chamber 32, through gaps 22, during the curing period, there are provided shutter means for the gaps that are automatically operable to open and close the gaps 22 upon movement of doors 35, to open and close the opposed ends of the curing chamber 32.

As illustrated in the drawings, the gap-shutting means for each of the walls of the chamber 32 may comprise a pair of vertically movable shutter sections, 50a and 50b, disposed, preferably, on the exterior of a wall 10; each section adapted to close one portion of a gap 22, to one side of the beam 20. Shutter portions 50a and 50b may each be heat insulating and therefore relatively heavy, for gravitational downward movement, and may each have rods, 52, extending upwardly from its upper edge, that are guided in guideways, 53, formed by one or more horizontally-disposed bars, 56, supported on the associated upper wall section 16, in spaced, parallel relation thereto.

Each shutter section 50a and 50b is of a length equal to the length of a section of the gap 22 to one side of a beam 20, and of a width at least as great as the height of a gap 22, and preferably slightly greater than that; and has connected to its upper edge, at its center, a cable. 58, that may be passed over a series of pulleys, 60, and connected to a movable block, 62, mounted on top of door-supporting rails 36, in position that when the door is near the end of its opening movement, a projecting member, 63, therein, will engage and move block 62 with it and thereby raise the shutter sections connected to it to open a section of the gap 22, to permit movement of a shaft 46 of a carriage 42 therethrough. Upon movement of the door to closing position, block 60 will be released from the door for movement to permit lowering of the connected shutter to gap-closing position. Each pair of shutter sections 50a and each pair of shutter sections 50b may preferably be connected to a different one of the two doors 35.

In order to accommodate each shaft 46 at the inner end of the gap section into which it is movable, without interfering with the lowering of the shutter for that gap section, and, also, to permit the other shutter to completely close the gap section with which it is associated when a shaft is disposed at the inner end of the other gap section, each shutter may have an inner portion, 64, which is connected at its lower end to one end of an elongated bar, 66, whose other end is pivoted at the bottom of the far end of the shutter section, as at 68. The contacting edges between the shutter portions are disposed diagonally on a line sloping inwardly from their upper edges. Thus, when a shaft 46 is disposed at the inner end of a gap section and the shutter section thereof is lowered, its inner shutter portion 64 will pivot upwardly to provide a space for accommodating the shaft, as clearly shown in FIGS. 2 and 3; whereas the other shutter for covering the other section of the gap 22 will move as a unit into closing position, to cover the entire gap section, as shown in FIG. 4. A guide element 67 is provided on the outer face of the upper corner of each shutter section 50 overlying the exterior of its pivoted inner portion 68 to maintain the latter in alinement with its associated main shutter section.

Means are also provided for closing gaps 28 of cooling compartments 34, to prevent cooling spray from escaping through the gaps and creating a mess around the apparatus. Such means may comprise a pair of baffle members of substantially equal size for each gap 28 of each side wall of each cooling compartment 34; each pair including an inner baffle, 70a, and an outer baffle, 70b. The baffles are preferably disposed on the interior of a compartment 34.

Each baffle 70a and 70b comprises an elongated plate, as of metal, of a length slightly greater than half the length of a gap 28 and of a width greater than the width of a gap 28 and sufficient to obstruct the same against spray leakage. Each baffle may have a portion of one corner thereof cut away to provide a pair of edges, 72 and 74, respectively, parallel to and normal to the longitudinal edges of the plate. Preferably, the junction between such edges may be arcuate. The cut-out portion leaves a longitudinally-extending nose, 76. Each pair of baffles is pivoted adjacent one end on the lower wall section 26 of a cooling compartment, adjacent the upper edge of such wall sections, with the cut-out portion upwardly extending, and with the noses 76 overlapping. The points of pivot, 78a and 78b, for the baffles 70a and 70b, are each slightly to one side of the center of the gap and are so arranged that when the edges 74 of the cut-out are vertically disposed they are spaced apart a distance equal substantially to the thickness of a shaft 46. The points of pivot 78a and 78b are also so arranged that when the baffle is in suspended position the edge portion 74 is disposed substantially on a level with the upper edge of wall section 26, with the edge portion 72 projecting above such edge, opposite the gap 28; and when the baffle is in horizontally-extending position, the edge portion 72 of the nose 76 is disposed slightly above the upper edge of wall section 26, and the edge portion 74 rises upwardly opposite the gap 28.

Preferably, means are provided to prevent the baffle sections 70a and 70b from becoming fully gravitationally suspended and to maintain them in sloping, partly suspended position. Such means may comprise the diagonally-disposed bars, 80, secured on the inner face of the wall section 26, against which the lower edges of the baffle section may abut when in suspended position.

Preferably, also, means may be provided for maintaining the baffles in closely spaced parallel relation to wall section 26. Such means may comprise a curved outer edge, 82, on each baffle, which rides in the curved guideway, 84, mounted on the inner face of wall 26.

It will be clear that when a carriage 42 is moved from the service area into a cooling compartment its shaft 46 will move through a gap 28 until it encounters the upstanding nose 76 of the outer baffle 70b, and press against the nose 76 thereof to move baffle 70b to horizontal, gap-closing position. Initially, inner baffle 70a will have to be manually raised to horizontal position, so as not to interfere with the continued movement of the shaft 46 through gap 28. Such continued movement will then bring shaft 46 in contact with the nose, 76, of baffle 70b, to push against it and move baffle 70b into diagonal position, leaving its gap section open, to permit shaft 46 to continue through gap 28 into gap 22 of the curing chamber; baffle member 70a remaining in horizontal, gap-closing position by means hereinafter described.

On the return of the carriage 42, the shaft 46 will move freely through the open inner portion of gap 28 until it encounters the upstanding edge portion 72 of suspended baffle 70a, which it will do as it reaches the center of gap 28, and of the cooling compartment 34, to elevate baffle 72a into gap-closing position and then stop. As baffle 72b is already in closing position, the entire gap 28 will now be closed, for the cooling procedure. After the cooling procedure is completed, the carriage is moved outwardly so that shaft 46 displaces baffle 72b from horizontal to diagonal position; the inner baffle 70a remaining in closed position. This procedure is repeated each time a carriage 42 is moved in and out of the cooling compartment and curing chamber.

Figure 6:
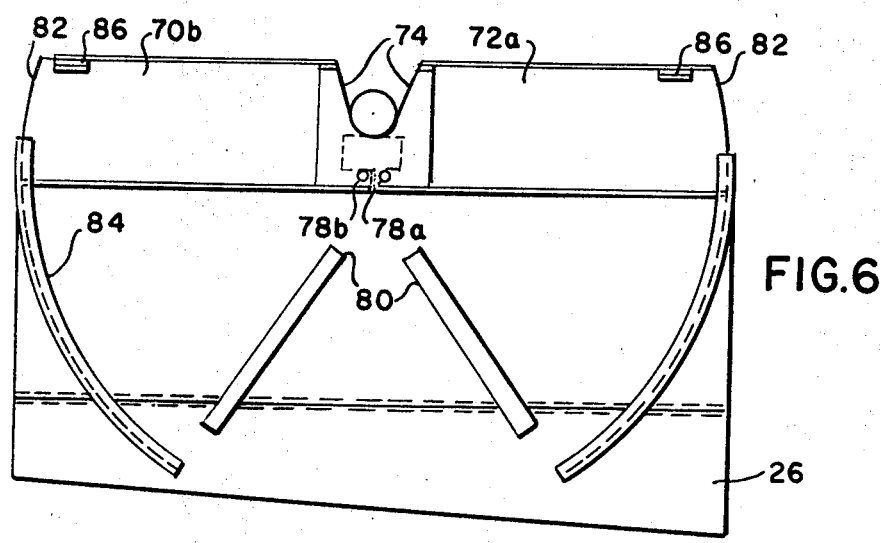
Figure 7:
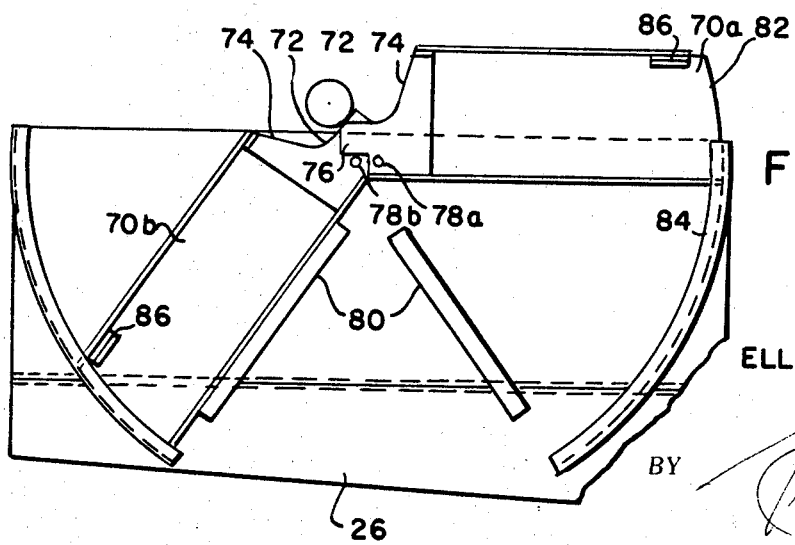

Means are provided for releasably maintaining baffles 70a and 70b, individually, in horizontal, gap-closing position once they have been moved thereinto, until released by pressure of a moving shaft 46 against the edge portion 72 thereof. In FIGS. 5, 6 and 7, such releasable retaining means are shown to comprise magnets 86, which may be attached to the upper edge of each baffle at its end remote from the pivot, as illustrated, or to the upper wall portion 24 of the compartment, in position to be contacted by the free edge of a baffle when in gap-closing position.

Figure 8:
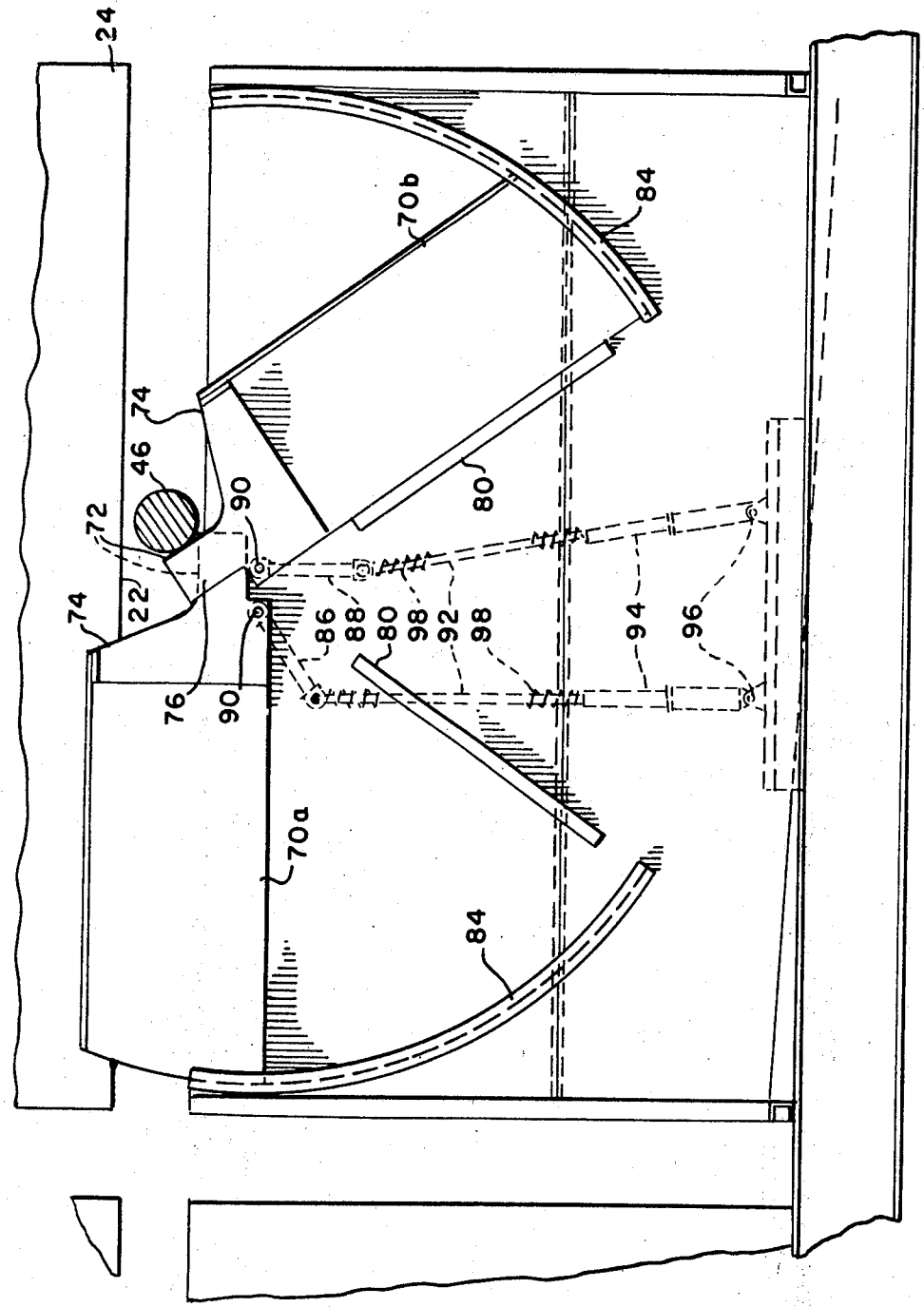
FIG. 8 is an elevational view as seen from the interior showing one form of releasable means for maintaining the closure means of FIGS. 5, 6, and 7 in closed position.

Another and more positive releasable retaining means is illustrated in FIG. 8 in the form of a toggle structure, preferably disposed on the exterior of the compartment wall. In such embodiment, a lever arm 88 is fixed by one end on the pivot pin 78 of a baffle in position to extend at a diagonally downward angle, across the lower edge of the baffle, in the direction of its companion baffle. The other end of the lever 88 is pivotally connected to a rod 92, whose free end reciprocates in a sleeve 94, whose lower end is pivotally supported, as at 96, at the bottom of the wall section 26. The rod 92 is spring-tensioned by an expansion coil spring 98, which is fitted thereover, one of whose ends abuts the pivot joint 92 and the other of its ends abut the edge of the sleeve 94. The lower end of the sleeve 94 is pivoted in such position that when the connected baffle is in horizontal position the rod 92 and sleeve 94 are in a straight, upright position and maintained in such position by the pressure of expansion spring 98. When the baffle is moved out of closing position as shown at the right in FIG. 8, lever 88 is in substantially upright position but rod 92 is tilted at an angle to the horizontal, and out of position of being itself capable of moving lever 88 back into its original position.

This completes the description of the improvement in rotational molding apparatus of the present invention. It will be readily apparent that the shutter means of the present invention are of relatively simple construction and mode of operation, and that their operation is automatic with the movement of the doors opening and closing the curing chamber and requires no separate attention; that they are capable of accommodating a mold-supporting shaft without interference with the closing of the shaft pathway on the side from which it is brought into the curing chamber, and at the same time capable of completely closing the pathway in the other part of the chamber where no shaft is present.

It will also be apparent that the means for closing or blocking the pathway to the cooling compartment are likewise of simple construction and are automatically operated by the movement of the mold-supporting shaft through the pathway, to open the necessary portions as required for the travel of the shaft, and to close the pathway completely during the cooling operation; and that the portions of the pathway may remain closed until the closing baffle is moved out therefrom by the positive action of a moving shaft.

It will also be apparent that numerous modifications and variations may be made in the improvement in rotational molding apparatus of the present invention by anyone skilled in the art, in accordance with the principles of the invention hereinabove set forth, without the exercise of any inventive ingenuity. I desire, therefore, to be protected for any and all such modifications and variations that may be made within the spirit of the invention and scope of the claims hereto appended.

What I claim is:

1. In rotational molding apparatus, of the character described, including a curing chamber open at one end and a cooling compartment contiguous to the open end of said curing chamber and opening thereinto, a door movable to alternately connect and separate said chamber and said compartment; the side walls of said chamber and compartment having alined gaps formed therein wherethrough a rotatable molds-supporting shaft may be moved through said compartment into and out of said chamber, the improvement consisting of the means for opening and closing said chamber-wall gaps actuated by the movement of said door into and out of position of connecting said chamber and said compartment, and means opening and closing said compartment gaps as said shaft is moved therethrough out of and into closing position.

2. The rotational molding apparatus of claim 1, wherein said means for closing said chamber gaps comprise shutters slidable on the walls of said chamber; means retaining and guiding said shutters in position for reciprocal movement on said walls; and means connecting said shutters to said door for movement of said shutters upon movement on said door.

3. The rotational molding apparatus of claim 2, wherein said curing chamber is open at each end and a cooling compartment is provided at each open end of said curing chamber and wherein said gap-closure means comprises a pair of shutters each adapted to close a portion of a gap adjacent one of said cooling compartments.

4. The apparatus of claim 3, wherein said shutters and said means for retaining and guiding same are disposed on the exterior of said walls.

5. The rotational molding apparatus of claim 3, wherein said shutters and said means for retaining and guiding the same are disposed alongside the upper portion of said chamber walls, above said gaps, and means are connected to said shutters for engagement, by said doors upon movement into open position, to raise said shutters for opening said gaps and said shutters move gravitationally for closing said gaps upon movement of said doors into closing position.

6. The rotational molding apparatus of claim 5, wherein means are provided for supporting said doors for lateral movement into and out of chamber-closing position, and wherein the means connected to said doors comprise a cable connected to each said shutter by one end thereof and to a movable member by its other end, means mounting said member for reciprocal movement adjacent said wall, and means on said door engaging said member for movement therewith upon movement of said door into opening position.

7. The rotational molding apparatus of claim 3, wherein said shutters are heat insulating.

8. The rotational molding apparatus of claim 5, wherein the inner portion of each said shutter adapted to overlie a shaft when said shaft is disposed within said chamber is separate from and hinged upon the other portion thereof and in longitudinal alinement therewith, to be vertically replaceable relative thereto and thereby permit accommodation of said shaft within said gap while said gap is closed.

9. The rotational molding apparatus of claim 8, wherein means are provided for guiding said hinged shutter portion and maintaining said hinged shutter portion in alinement with said other portion of a shutter.

10. The rotational molding apparatus of claim 1, wherein said closure means for each said compartment gap comprises a pair of baffles each pivotally supported at one end on a wall of said compartment at a point adjacent the longitudinal center of said wall and in position for rotational movement in and out of gap-closing position; the inner end of each said baffle engageable by a shaft moved through said gap, to be moved into closing position upon movement of said shaft from said chamber into said compartment and into opening position upon movement of said shaft from said compartment into said chamber, the outer one of said baffles movable into open position upon movement of said shaft outwardly of said compartment and into closing position upon movement of said shaft into said compartment from its outer end, and means releasably retaining each said baffle in gap-closing position until displaced therefrom by engagement by said shaft.

11. In apparatus, of the character described, including a curing chamber open at least at one end, a cooling compartment communicating with said curing chamber at said end, a door between said chamber and compartment movable to permit closing the same from one another, a continuous gap formed in each wall of the chamber and compartment for moving a rotational mold-supporting shaft through said cooling compartment to and from said curing chamber and means opening and closing said curing chamber wall gaps, the improvement of means for closing the gap in each wall of said compartment comprising a pair of baffles each pivotally supported at one end on a wall of said compartment at a point adjacent the longitudinal center of said wall and in position for rotational movement in and out of gap-closing position; the inner one of said baffles engageable by a shaft moved through said gap, to be moved into closing position upon movement of said shaft from said chamber into said compartment, and into opening position upon movement of said shaft from said compartment into said chamber, the outer one of said baffles movable into open position upon movement of said shaft outwardly of said compartment and into closing position upon movement of said shaft into said compartment from its outer end, and means releasably retaining each said baffle in gap-closing position until displaced therefrom by engagement of said shaft.

12. The apparatus of claim 11, wherein each said baffle is provided with an approximately L-shaped cut-out at the upper corner of its pivoted end, the longitudinally-extending edge of said cut-out engaged by said shaft in its movement through said gap to dispose said baffle in gap-closing position, and the other edge of said cut-out engaged by said shaft in its movement through said gap to displace said baffle from gap-closing position.

13. The apparatus of claim 11, wherein means are provided for limiting the movement of each said baffle away from closing position, whereby said baffle rests in a diagonal position when moved from gap-closing position.

14. The apparatus of claim 11, wherein at least a selected one of each said baffle and said wall section is of a ferrous metal and wherein said means for maintaining said baffles in gap-closing position comprise a magnet adapted to contact said ferrous metal member when said baffle is in gap-closing position, said magnet secured to the other of said members.

15. The apparatus of claim 11, wherein said means adapted to releasably maintain said baffles in gap-closing position comprise toggle means arranged to support said baffle in gap-closing position and to be displaced from said supporting position when said baffle is displaced by said shaft from gap-closing position.

16. The apparatus of claim 15, wherein each said baffle is fixedly secured on a pin rotatably supported in said wall section and said means releasably maintaining said baffle in gap-closing position comprise a lever fixedly secured to said pivot pin at an angle to a longitudinal edge of the baffle, the other end of said lever pivotally secured to a telescopically supported spring-loaded rod, said lever and said rod arranged to have said rod in upright position when said baffle is in closing position and to be disposed at an angle to the upright when said baffle is moved out of gap-closing position.

17. The apparatus of claim 16, wherein said pin extends to the exterior of said wall section and said lever and said rod are disposed on the exterior of said wall section.

18. The apparatus of claim 11, wherein means are provided for guiding and maintaining said baffles in closely parallel relation to said compartment walls.

19. The apparatus of claim 18, wherein said guiding means comprise an arcuate edge at the outer end of each said baffle and an arcuate guideway mounted on said wall section engaging over said outer edge of said baffle.

References Cited

UNITED STATES PATENTS

| | | | |
|---|---|---|---|
| 1,861,465 | 6/1932 | Woodson | 25—142 XR |
| 1,858,433 | 5/1932 | Colby | 25—142 XR |
| 1,870,080 | 8/1932 | Woodson | 25—142 XR |
| 1,887,904 | 11/1932 | Johnson | 25—142 |
| 2,834,986 | 5/1958 | Barley et al. | 18—26 |
| 3,237,247 | 3/1966 | Eggert et al. | 18—26 |

WILLIAM J. STEPHENSON, Primary Examiner

U.S. Cl. X.R.

25—142: 263—28; 34—242